United States Patent [19]
Fukushima

[11] Patent Number: 5,551,318
[45] Date of Patent: Sep. 3, 1996

[54] POWER TRAIN FLYWHEEL ASSEMBLY WITH FLEXIBLE INPUT-SIDE INCORPORATING DAMPING MECHANISM

[75] Inventor: Hirotaka Fukushima, Hirakata, Japan

[73] Assignee: Kabushiki Kaisha Daikin Seisakusho, Osaka, Japan

[21] Appl. No.: 393,778

[22] Filed: Feb. 24, 1995

[30] Foreign Application Priority Data

Feb. 25, 1994 [JP] Japan .................................. 6-028140

[51] Int. Cl.⁶ ...................................................... F16F 15/10
[52] U.S. Cl. .......................... 74/574; 192/70.17; 192/208; 464/101
[58] Field of Search .................... 74/572, 573 R, 74/574; 192/55.3, 55.4, 70.17, 207, 208; 464/77, 101

[56] References Cited

U.S. PATENT DOCUMENTS

| | | | |
|---|---|---|---|
| 1,268,632 | 6/1918 | Schanffelberger | 464/77 |
| 1,953,211 | 4/1934 | Benedek | 464/101 |
| 2,775,105 | 12/1956 | Banker | 464/101 |
| 3,275,108 | 9/1966 | General et al. | 192/55.3 |
| 3,534,807 | 10/1970 | Bracken | 464/101 |
| 5,042,632 | 8/1991 | Jäckel | 74/574 |
| 5,146,811 | 9/1992 | Jäckel | 74/574 |
| 5,191,810 | 3/1993 | Craft et al. | 74/572 |
| 5,218,884 | 6/1993 | Röhrle | 74/572 |
| 5,355,747 | 10/1994 | Kajitani et al. | 74/572 |
| 5,377,560 | 1/1995 | Schierling et al. | 74/572 |

FOREIGN PATENT DOCUMENTS

| | | |
|---|---|---|
| 3023300 | 5/1981 | Germany . |
| 3909892 | 10/1989 | Germany . |
| 4140822 | 6/1992 | Germany . |

*Primary Examiner*—Rodney H. Bonck
*Assistant Examiner*—Chong H. Kim
*Attorney, Agent, or Firm*—Shinjyu Office of Patent Attorneys

[57] ABSTRACT

A vehicle power train flywheel assembly having an input-side flexible coupling and power transmission damping mechanism whereby power is transmitted from the crankshaft of an engine to a main body of the flywheel assembly via a combination viscous fluid and elastic damping device. The power trans-mission damping mechanism includes a flexible annular input plate formed from sheet metal, and a rimmed sub-plate that together with the input plate forms a viscous fluid chamber, in which an undulated ribbon spring, as the elastic damping device, is installed. During power transmission the ribbon spring is compressed between an input-side sub-plate and an output side stop plate of the flywheel assembly, and torsional fluctuations meanwhile expanding and contracting the ribbon spring are damped as the narrow duct surrounding the ribbon spring chokes the flow of viscous fluid, developing viscous damping resistance. Transmission of flexural vibrations to the output side of the flywheel assembly is checked by the flexibility of the input plate, and further by the fact that the flywheel main body bearing is mounted on a bearing rim formed as an extension of the radially inward margin of the input plate. A sandwich of fixing plates is flexibly attached to the radially inward margin of the input plate by a circular array of mounting rivets, for fixing the input plate to the crankshaft of an engine.

14 Claims, 2 Drawing Sheets

POWER TRAIN FLYWHEEL ASSEMBLY WITH FLEXIBLE INPUT-SIDE INCORPORATING DAMPING MECHANISM

BACKGROUND OF THE INVENTION

1. Field of the Invention

The present invention relates to a flywheel assembly in a vehicle power train. In particular, the invention relates to a flywheel assembly having a flexible input member, connectable to the crankshaft of an engine, and a damping mechanism supported on the flexible input member wherein power is transmitted to a main portion of the flywheel assembly via a combination viscous fluid and elastic damping means.

2. Description of Related Art

The damping out of torsional vibrations due to torque fluctuations transmitted from an internal combustion engine as the power-input source in a motor vehicle power train is an ongoing concern in the development of power train transmission devices. The problematic vibrations must be damped out in the transmission of power between the engine-power input side and the drive-shaft engaging output side (which can twist relative to the input side) of the power train ahead of the gearbox. For this purpose, elastic damping elements, typically coil springs, are conventionally introduced into the flywheel and/or clutch assemblies of the power train, to augment the smoothing out of torsional vibrations provided by the flywheel's inertial mass.

It is well known in the art to provide a viscous damping means. For example, a viscous damping mechanism may be provided within a power train flywheel assembly, wherein chief components of the flywheel assembly are elastically connected in the direction of power transmission rotation by coil torsion springs.

Flexural vibrations, transmitted from the crankshaft of the engine, are not, however, effectively damped by the means just described. Accordingly, it has been conceived to employ a flexible plate or the like for connecting the power train flywheel assembly, nonetheless incorporating the torsional vibration damping mechanism, with the engine crankshaft in order to damp out and absorb such flexural vibrations. Design problems herein include complicating overall construction by the addition of the flexible plate, increasing the axial dimension of the power train section and making extra parts necessary.

SUMMARY OF THE INVENTION

An object of the present invention is to simplify construction of a flywheel assembly.

Another object is to dampen torsional vibrations as well as flexural vibrations simply and through economical means, in power transmission from the engine to the gearbox of a motor vehicle power train.

A further object of the present invention is to reduce the axial dimension of the power train section.

Yet another object is to reduce the weight of a combined input-side flexible coupling and power transmission damping mechanism in the power train section.

A still further object of the invention is to maintain inertial mass necessary to smooth out torsional vibrations as ordinarily provided by the flywheel in power transmission, while at the same time reducing the weight of the power train section, In one aspect of the present invention, a flywheel assembly includes an annular fixing plate connectable to an engine power output shaft formed from sheet metal material. A flexible annular input plate formed from sheet metal is connected to the annular fixing plate, the input plate formed with an inner radial lip and an outer radial lip. A sub-plate is fixed to the input plate, the sub-plate and the input plate at least partially defining an annular fluid filled chamber therebetween. A bearing is supported on the inner radial lip of the input plate. A flywheel main body is mounted on the bearing freely rotatable relative to the input plate. An elastic spring element is disposed inside the fluid chamber, for elastically connecting both the input plate and the sub-plate with the flywheel main body.

It is preferable to have a ring component further included which is fixed to the outer peripheral portion of the input plate.

It is preferable that the input plate has a supporting portion formed by the inner peripheral edge curved on the main flywheel body and the bearing mounted to the supporting portion. Furthermore, it is preferable that the input plate has a flange on the outer peripheral edge and further includes a ring component fixed to the flange that fixes a ring gear to the outer peripheral portion. Even further, it is preferable that a component on the transmission side includes a pilot bearing mounting portion formed on the inner peripheral edge of the main flywheel body for the purpose of supporting a transmission shaft.

In a damping unit related to this invention, flexural and torsional vibrations are transferred from the input rotor to the flexible input plate and the sub-plate and then are further transferred to the output rotor via the elastic component inside the viscous fluid containment vessel. Because vibrations are transferred while the elastic component inside the viscous fluid containment vessel elastically changes shape during this time, viscous fluid flows in the periphery of the elastic component inside the viscous fluid containment vessel. While this viscous fluid flows, a viscous resistance generates and the torsional vibrations are dampened by this viscous resistance. Conversely, the input plate is a plate component made of sheet metal and because of its flexibility, the bending of this input plate makes the transmission of flexural vibrations to the output side difficult.

At this point, the input plate functions as a flexible plate so, consequently, there is no need for a separate flexible plate. Therefore, the construction becomes simple and economical.

When the fixing component is further included that is fixed to the inner peripheral portion of the input plate for the purpose of fixing the input plate to the input rotor, the fixing portion is reinforced by the fixing component which makes it possible to form an input plate which is more bendable making it more effective than the previously stated operation. When the fixing component is a plurality of plate component made of sheet metal, the space in the axial direction become smaller compared to the coil spring. When the ring component which is fixed to the outer peripheral portion of the input plate is further included, the ring component makes it easy to ensure the inertia that absorbs vibrations.

In a flywheel assembly and power transmission unit related to this invention, power is transmitted by the same operation stated above and torsional vibrations in the viscous fluid containment vessel are dampened. Further, the input plate makes it difficult to transmit flexural vibrations to the output side. Because of this, a flexible plate is not necessary.

When the input plate has a supporting portion formed by the inner peripheral edge curved on the main flywheel body and the bearing is mounted to the supporting portion, it becomes more difficult for flexural vibrations to be transmitted to the output side. Further, when the input plate has a flange on the outer peripheral edge and further includes a ring component fixed to the flange that fixes a ring gear to the outer peripheral portion, the ring component allows the inertia that absorbs vibrations to be ensured and makes it easy to absorb vibrations. Also, when a pilot bearing mounting portion is formed on the inner peripheral edge of the main flywheel body for the purpose of supporting the drive shaft, it becomes difficult for the pilot bearing to receive vibrations thereby increasing the usable life span.

BRIEF DESCRIPTION OF THE DRAWINGS

These and other objects, features, aspects and advantages of the present invention will become more fully apparent from the following detailed description of the present invention when taken in conjunction with the accompanying drawings, where like reference numerals denote corresponding parts throughout, in which.

DETAILED DESCRIPTION OF THE PREFERRED EMBODIMENT

Figure 1:
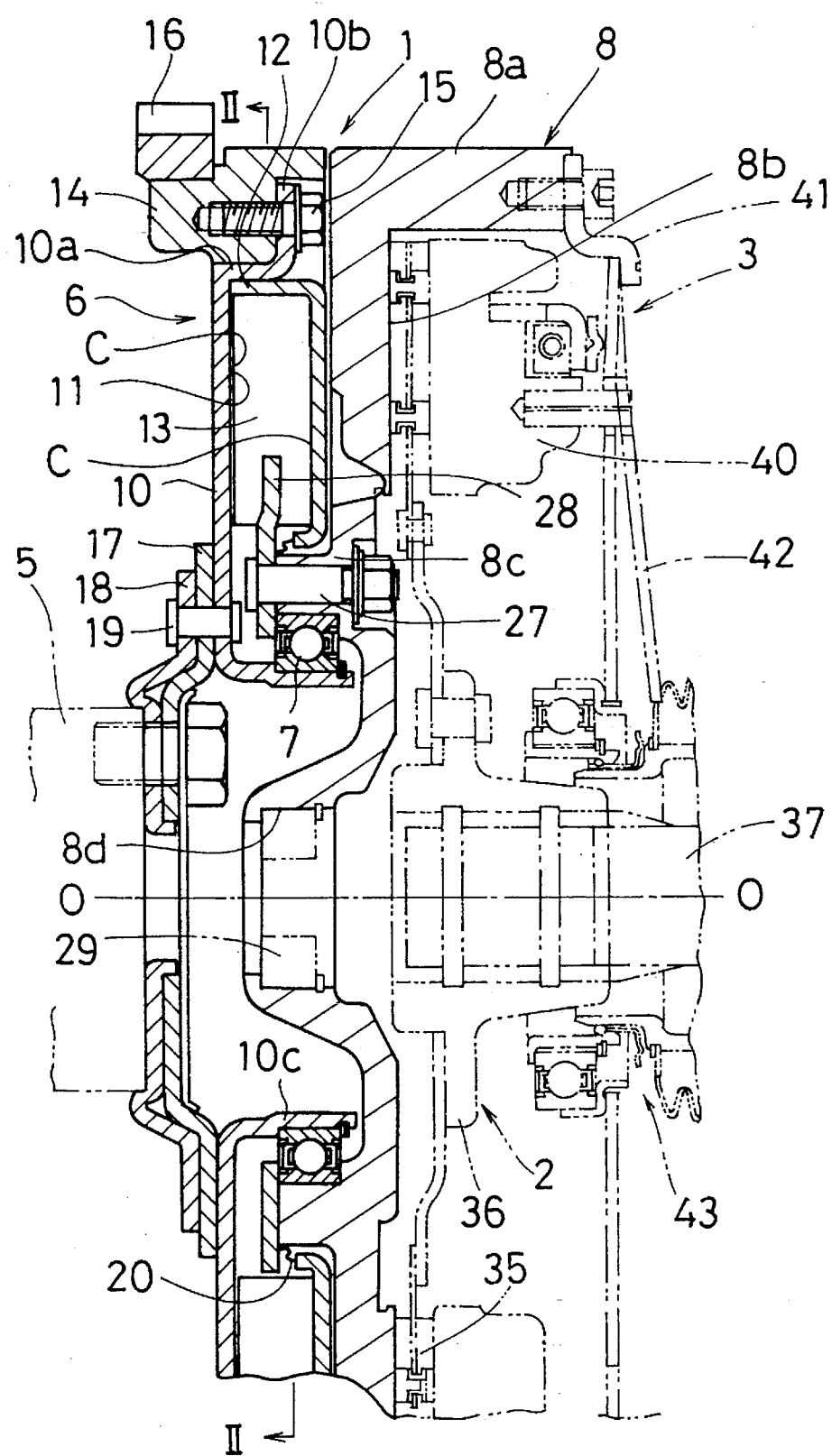
FIG. 1 is a fragmentary section of a flywheel assembly, in accordance with a preferred embodiment of the present invention, with fragmentary portions of an associated crankshaft and clutch mechanism indicated in phantom.
Figure 2:
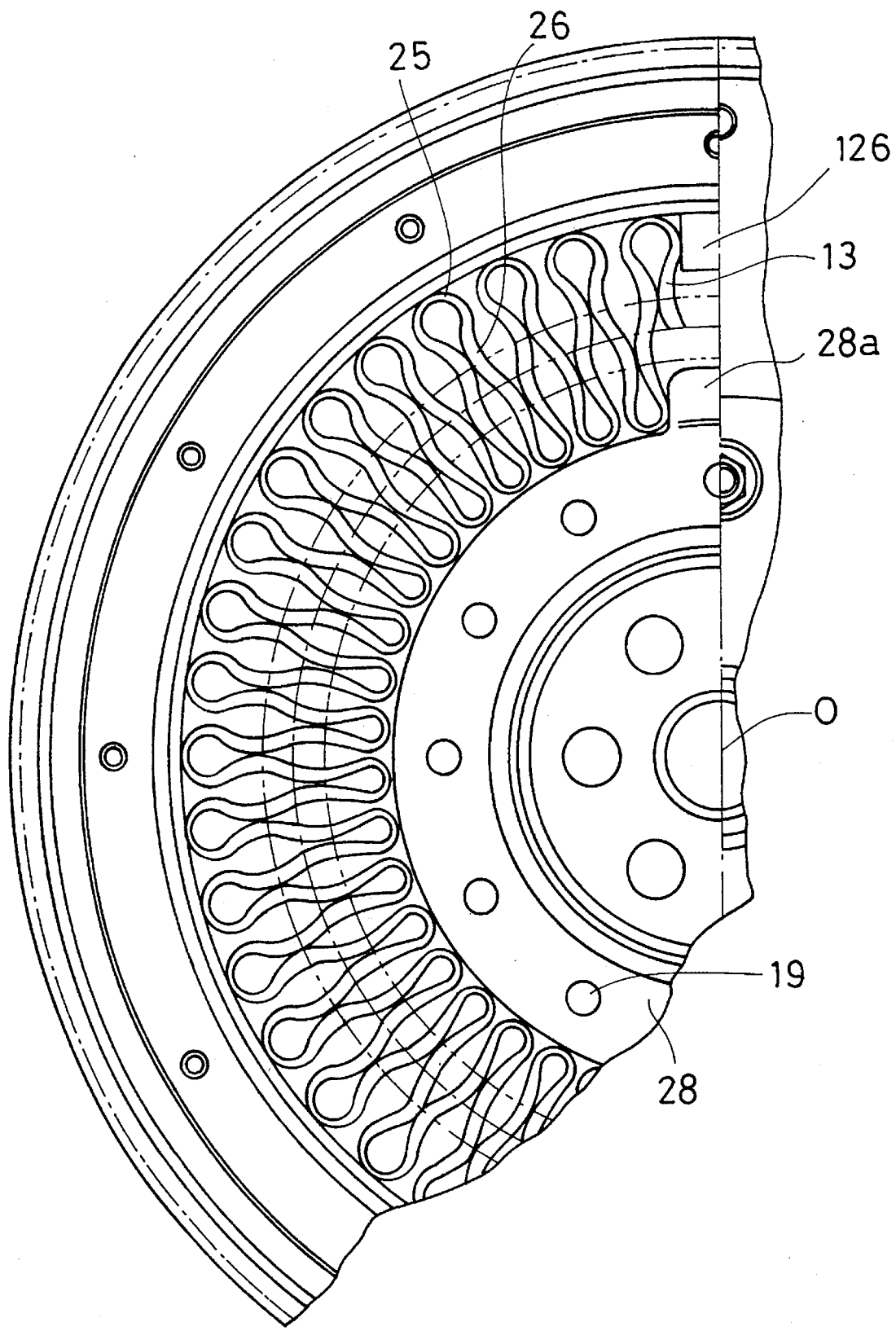
FIG. 2 is a fragmentary, part section of the flywheel assembly taken along the line II—II in FIG. 1.

One embodiment of the present invention is illustrated in FIGS. 1 and 2, wherein the line 0—0 is the engine crankshaft/power train rotation axis.

The power train section includes a flywheel assembly 1, a clutch disk assembly 2, and a clutch cover assembly 3.

The flywheel assembly 1 includes a power train input flexible coupling and power transmission damping mechanism 6 (hereinafter referred to simply as flexible input/damping mechanism 6), which can be joined to an engine crankshaft 5, and a flywheel main body 8 carried on a bearing 7 retained on the flexible input/damping mechanism 6.

The flexible input/damping mechanism 6 includes an input plate 10, and a rimmed sub-plate 12 that together with the input plate 10 forms a viscous fluid chamber 11. The viscous fluid chamber 11, filled with grease or other suitable viscous damping fluid, contains a flat, undulated ribbon spring 13. The ribbon spring 13 is a further component of the flexible input/damping mechanism 6.

The input plate 10 is made of, for instance, worked sheet-metal, formed from plate material to have a generally annular shape. The radially outer periphery of the input plate 10 is bent into a rim 10a extending toward the flywheel main body 8. Extending radially outward from the end of the rim 10a adjacent the flywheel main body 8 is a flange 10b. A remote flywheel annulus 14 is fixed to the flange 10b by bolts 15, and a ring gear 16 that can mesh with a starter motor pinion gear is fixed on the outer periphery of the flywheel annulus 14.

The radially inner periphery of the input plate 10 is bent toward the flywheel main body 8 to form a bearing rim 10c. A bearing 7 is mounted on the bearing rim 10c. Two annular fixing plates 17 and 18 made of sheet metal are fastened to the radially inward margin of the input plate 10 by rivets 19. The input plate 10 is therein mountable onto an engine crankshaft 5 through the two fixing plates 17 and 18.

The sub-plate 12 is formed so that the radially outer surface of the sub-plate 12 rim fits against the radially inner surface of the rim 10a of the input plate 10, wherein the exposed seam is welded to fix the sub-plate 12 to the input plate 10.

As shown in FIG. 2, the ribbon spring 13 is formed as a plurality of loop elements 25 connected in a circularly zig-zagged series with radially undulated lever elements 26. Each of the loop elements 25 are sectors of nearly identical size. In the free state, each loop element 25 rests at a given gap from its linearly adjacent loop element(s) 25. Installed, portions in the terminal ends of the ribbon spring 13 stop on diametrically opposed tabs 12c (only one is shown in FIG. 2) projecting radially inward from the sub-plate 12.

The axial width of the ribbon spring 13 is not quite the axial width of the viscous fluid chamber 11. Therefore, there is a space on either side of the ribbon spring 13, the spaces defining choking ducts C between the axial ends of the ribbon spring 13 and the side walls of the viscous fluid chamber 11 (i.e., the inner radial surfaces of the input plate 10 and the sub-plate 12).

Along the circumference of the annular flywheel main body 8 is a tubular extension 8a toward the clutch disk assembly 2. A friction facing 8b is formed on the flywheel main body 8 radially inward of the tubular extension 8a.

A boss portion 8c formed radially inward of the friction facing 8b rides on the bearing 7, which thereby carries the flywheel main body 8. Further, a stop plate 28 is mounted onto the boss portion 8c with mounting pins 27.

A seal 20 sealing the viscous fluid chamber 11 is installed between a radially inner lip of the sub-plate 12 and the stop plate 28 against the boss portion 8c of the flywheel main body 8.

Diametrically opposed tabs 28a (only one is shown in FIG. 2) are formed protruding radially outward along the circumference of the annular stop plate 28. Portions in the terminal ends of the ribbon spring 13 abut on the tabs 28a in the circumferential direction of the stop plate 28.

The central portion of the flywheel main body 8 forms a hub 8d for holding a pilot bearing 29.

The clutch disk assembly 2 chiefly includes a clutch disk 35 that in operation is compressively clamped to the friction facing 8b of the flywheel main body 8, and a splined hub 36 carrying the clutch disk 35. The hub 36 is spline-fitted to a drive shaft 37 of an associated power train gearbox or transmission. The clutch cover assembly 3 includes a pressure plate 40 that clamps the clutch disk 35 between itself and the friction facing 8b of the flywheel main body 8, a clutch cover 41 fixed to the axial end of the tubular extension 8a of the flywheel main body 8, and a diaphragm spring 42 for pressing the pressure plate 40 toward the flywheel main body 8. A clutch release mechanism 43 is disposed along the radially inner margin of the diaphragm spring 42.

In operation, power is transmitted in a motor vehicle power train section embodied according to the present invention from the engine crankshaft 5 to the input plate 10 through the fixing plates 17 and 18. Power is then transmitted via the sub-plate 12 to the ribbon spring 13, through which in turn power is transmitted to the main flywheel body 8 via the stop plate 28.

Accordingly, during power transmission the ribbon spring 13 is compressed between the sub-plate 12 and the stop plate 28, causing viscous fluid inside the viscous fluid chamber 11 to flow relative to the duct surrounding the ribbon spring 13.

Torsional fluctuations expanding and contracting the ribbon spring 13 are damped as the narrow duct chokes the flow of the fluid, such that viscous damping resistance develops.

On the other hand, transmission of flexural vibrations to the output side of the flywheel assembly 1 in axial directions are checked by the flexibility afforded the input plate 10, since it is made of sheet metal.

Transmission of flexural vibrations to the flywheel main body 8 is further checked by the fact that the bearing 7 is mounted on the bearing rim 10c as an extension of the input plate 10.

The fixing plates 17 and 18 provide means for securely mounting the input plate 10 to the crankshaft 5 of an engine.

Moreover, although the moment of inertia of the input plate 10 itself is small, the moment of inertia of the flywheel annulus 14 together with the ring gear 16, as mounted on the radially outer periphery of the input plate 10, is large, such that input-side vibrational damping provided by inertial mass is retained.

The axial dimension of the flexible input/damping mechanism 6 is reduced in this embodiment when compared to the prior art, owing to the flatness of undulated ribbon spring 13 used as the elastic component connecting the input/output sides of the flywheel assembly 1, and to the sheet metal formation of the input plate 10.

Although in the embodiment as described above the specially contoured ribbon spring 13 is employed as an elastic connector within flywheel assembly 1, a coil spring can also be used.

Furthermore, holes medially penetrating the lever elements 26 of the ribbon spring 13 can be provided for allowing inter-lever passage of viscous fluid as the ribbon spring 13 contracts and expands in the flexible input/damping mechanism 6.

When the fixing component is a plurality of plate component made of sheet metal, the construction becomes simple and economical. Further, when the elastic component is a curved flat spring, the space in the axial direction becomes small compared to a coil spring. When a ring component fixed to the outer peripheral portion of the input plate is further included, the ring component makes it easy to ensure the inertia that absorbs vibrations.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A flywheel assembly comprising:

an annular flexible input plate formed from sheet metal, coupleable to a crankshaft of an internal combustion engine;

a sub-plate fixed to said input plate, said sub-plate and said input plate at least partially defining an annular fluid filled chamber;

an annular flywheel rotatably supported on a portion of said annular input plate; and an elastic spring element disposed inside said annular fluid filled chamber;

wherein said elastic spring element defines at least one choking duct between an inner surface of said annular fluid filled chamber and an axial edge of said elastic spring element, said choking duct creating fluid flow resistance in response to relative rotary displacement between said annular flywheel and said annular input plate, and said elastic spring element elastically connects said annular input plate and said annular flywheel for limited relative rotary displacement therebetween.

2. A flywheel assembly as in claim 1, further comprising a fixing member fixed to a radially inward portion of said annular input plate, for rigidly coupling said annular input plate to a crankshaft.

3. A flywheel assembly as in claim 2, wherein said fixing member is formed from a plurality of sheet metal plates.

4. A flywheel assembly as in claim 1, wherein said elastic spring element is an ribbon spring.

5. A flywheel assembly, comprising;

an annular fixing plate configured for attachment to a crankshaft of an internal combustion engine;

a flexible annular input plate formed from sheet metal, couple d to said annular fixing plate;

a sub-plate fixed to said input plate, said sub-plate and said input plate at least partially defining an annular fluid filled chamber therebetween;

a bearing supported on a radially inward portion of said input plate;

a flywheel main body mounted on said bearing freely rotatable relative to said input plate; and an elastic element disposed inside said fluid chamber, for elastically connecting both said input plate and said sub-plate with said flywheel main body.

6. A flywheel assembly as in claim 5, wherein said input plate is formed to have a radially inward bearing rim, and said bearing is disposed on said bearing rim.

7. A flywheel assembly as in claim 6, wherein said input plate is formed to have a radially peripheral flange, said flywheel assembly further comprising a flywheel annulus fixed to said flange and a ring gear fixed to an outer radial portion of said flywheel annulus.

8. A flywheel assembly as in claim 5, further comprising a power transmission output portion coupled to said flywheel main body, having a clutch disk, a pressure plate and a pilot bearing mounting portion formed in a radially inward of said flywheel main body protruding toward said input plate.

9. A flywheel assembly, comprising:

an annular fixing plate connectable to an engine power output shaft, said annular fixing plate being formed from sheet metal material;

a flexible annular input plate formed from sheet metal and connected to said annular fixing plate, said input plate formed with an inner radial lip and an outer radial lip;

a sub-plate fixed to said input plate, said sub-plate and said input plate at least partially defining an annular fluid filled chamber therebetween;

a bearing supported on said inner radial lip of said input plate;

a flywheel main body mounted on said bearing freely rotatable relative to said input plate; and an elastic element disposed inside said fluid chamber, for elastically connecting both said input plate and said sub-plate with said flywheel main body;

wherein said elastic element comprises at least one flat undulated ribbon spring disposed within said annular fluid filled chamber, said flat undulated ribbon spring including a plurality of loop elements symmetrically staggered across from and opening toward each other and a plurality of lever elements sequentially joining opposed alternate ends of said loop elements.

10. A flywheel assembly as in claim 9, wherein said loop sections are arranged obliquely so as to spread out from said opposite alternate ends of said loop sections.

11. A flywheel assembly as in claim 10, wherein gaps separate loop sections disposed adjacent to each other.

12. A flywheel assembly as in claim 11, wherein said alternate ends of each of said loop sections touch.

13. A flywheel assembly as in claim 12, wherein gaps separate said alternate ends of said loop sections.

14. A flywheel assembly comprising:

an annular fixing plate configured for attachment to a crankshaft of an internal combustion engine;

an annular flexible input plate formed from sheet metal, coupled to said annular fixing plate;

a sub-plate fixed to said input plate, said sub-plate and said input plate at least partially defining an annular fluid filled chamber;

a remote flywheel annulus fixed to an outer circumferential portion of said input plate;

an annular flywheel rotatably supported on a radially inward portion of said annular input plate; and an elastic spring element disposed inside said annular fluid filled chamber said elastic spring element elastically coupling said input plate and said annular flywheel for limited rotary displacement therebetween;

wherein said elastic spring element defines at least one choking duct between an inner surface of said annular fluid filled chamber and an axial edge of said elastic spring element, said choking duct creating fluid flow resistance in response to relative rotary displacement between said annular flywheel and said annular input plate, and said elastic spring element elastically connects said annular input plate and said annular flywheel for limited relative rotary displacement therebetween.

* * * * *